(12) United States Patent
Unger et al.

(10) Patent No.: US 10,320,692 B2
(45) Date of Patent: Jun. 11, 2019

(54) ETHERNET LOOPBACK DETECTION AND SERVICE TRAFFIC BLOCKING

(71) Applicant: FUJITSU LIMITED, Kawasaki-shi Kanagawa (JP)

(72) Inventors: Stephen John Unger, Newfoundland, NJ (US); Frank Schumeg, Sandyston, NJ (US)

(73) Assignee: FUJITSU LIMITED, Kawasaki (JP)

( * ) Notice: Subject to any disclaimer, the term of this patent is extended or adjusted under 35 U.S.C. 154(b) by 16 days.

(21) Appl. No.: 14/483,949

(22) Filed: Sep. 11, 2014

(65) Prior Publication Data

US 2016/0080120 A1  Mar. 17, 2016

(51) Int. Cl.
  *H04L 12/46* (2006.01)
  *H04L 12/741* (2013.01)
  *H04L 12/823* (2013.01)

(52) U.S. Cl.
  CPC ........... *H04L 47/32* (2013.01); *H04L 12/462* (2013.01); *H04L 12/4625* (2013.01); *H04L 45/74* (2013.01); *H04L 12/4641* (2013.01)

(58) Field of Classification Search
  None
  See application file for complete search history.

(56) References Cited

U.S. PATENT DOCUMENTS

| | | | |
|---|---|---|---|
| 7,660,306 B1* | 2/2010 | Eiriksson et al. | 370/392 |
| 8,681,641 B1* | 3/2014 | Sajassi | H04L 45/745 370/249 |
| 2002/0031086 A1* | 3/2002 | Welin | G10L 25/78 370/229 |
| 2002/0046291 A1* | 4/2002 | O'Callaghan et al. | 709/238 |
| 2003/0133450 A1* | 7/2003 | Baum | 370/389 |
| 2004/0062200 A1* | 4/2004 | Kesavan | H04L 47/10 370/235 |
| 2005/0163132 A1* | 7/2005 | Mieno et al. | 370/395.53 |
| 2006/0092840 A1* | 5/2006 | Kwan | H04L 47/10 370/230.1 |
| 2006/0248229 A1* | 11/2006 | Saunderson et al. | 709/245 |
| 2010/0272111 A1* | 10/2010 | Kini et al. | 370/395.53 |
| 2010/0284274 A1* | 11/2010 | Ghanadan | H04L 12/5693 370/230.1 |
| 2011/0141891 A1* | 6/2011 | So | H04L 45/507 370/235 |

OTHER PUBLICATIONS

"Introducing the Specifications of the Metro Ethernet Forum," MEF 20: User Network Interface Type 2 with Testing Support via MEF21 & MEF24; http://metroethernetforum.org/carrier-ethernet/technical-specifications (downloaded on Sep. 11, 2014), Jul. 2008.

(Continued)

*Primary Examiner* — Angel T Brockman
(74) *Attorney, Agent, or Firm* — Baker Botts L.L.P.

(57) ABSTRACT

A method and system for Ethernet loopback detection snoops an egress frame at a UNI-N edge device and records at least one source field of the egress frame, such as a MAC address or a VLAN tag. Ingress frames at the UNI-N edge device are monitored for having the same value in the source field as the egress frame. When an ingress frame has the same source field value as the egress frame, the ingress frame is identified as a loopback frame and is dropped at the UNI-N edge device.

14 Claims, 4 Drawing Sheets

(56) References Cited

OTHER PUBLICATIONS

MEF Technical Specification, MEF 20, User Network Interface (UNI) Type 2, Implementation Agreement; http://metroethernetforum.org/carrier-ethernet/technical-specifications (downloaded on Sep. 11, 2014), Jul. 2008.
IEEE Standard for Local and Metropolitan Area Networks: Virtual Bridged Local Area Networks, IEEE Std 802.1Q; 303 pages, 2005.
IEEE Standard for Local and Metropolitan Area Networks: Overview and Architecture, IEEE Std 802; 47 pages, 2001.
IEEE Standard for Ethernet, IEEE Std 802.3, Sections 1-6 (Sec. 1: 634 pgs.; Sec 2: 780 pgs.; Sec. 3: 358 pgs.; Sec. 4: 732 pgs.; Sec. 5: 844 pgs.; Sec. 6: 400 pgs.), Amendments 1-3 (Amend. 1: 103 pgs.; Amend. 2: 367 pgs.; Amend. 3: 170 pgs.), 1 Definition (415 pgs.); 4,803 pages total, 2012-2015.

* cited by examiner

ETHERNET LOOPBACK DETECTION AND SERVICE TRAFFIC BLOCKING

BACKGROUND

Field of the Disclosure

The present disclosure relates to networked communications and, more specifically, to Ethernet loopback detection and service traffic blocking.

Description of the Related Art

In telecommunications, information is often sent, received, and processed according to the Open System Interconnection Reference Model (OSI Reference Model or OSI Model). In its most basic form, the OSI Model divides a network architecture into seven layers which, from top to bottom, are the Application, Presentation, Session, Transport, Network, Data-Link, and Physical Layers, which are also known respectively as Layer 7 (L7), Layer 6 (L6), Layer 5 (L5), Layer 4 (L4), Layer 3 (L3), Layer 2 (L2), and Layer 1 (L1). It is therefore often referred to as the OSI Seven Layer Model.

A particular network element may function as a bridge and may forward network traffic based on unique identifiers (e.g., addresses such as MAC addresses) associated with network segments or sub-networks coupled to the particular network element at corresponding egress interfaces of the particular network element. In certain network architectures, a connection-oriented Ethernet (COE) is implemented that enables forwarding based on virtual local area network (VLAN) tags included in Ethernet frames.

When network traffic is forwarded to a customer network by a service provider network, loopback connections that directly return the network traffic to the service provider network may be undesirable and may be a risk to network operations.

SUMMARY

In one aspect, a disclosed method for Ethernet loopback detection includes snooping an egress frame at a network element. The network element may be an edge device of a user network interface in a service provider network (also referred to as a UNI-N device). The network element may be coupled to a customer network at the user network interface (also referred to as a UNI-C device). The method may include storing a first media access controller (MAC) address from a first source field of the egress frame, and monitoring an ingress frame received from the customer network. A second MAC address in the first source field of the ingress frame may be compared with the first MAC address. When the second MAC address matches the first MAC address, the method may include dropping the ingress frame.

In particular embodiments, the method may include counting down a first aging time after snooping the egress frame. After the first aging time has elapsed, the method may include deleting the first MAC address. The method may further include storing a first virtual local area network (VLAN) tag from a second source field of the egress frame, while monitoring the ingress frame received from the customer network may include comparing a second VLAN tag in the second source field of the ingress frame with the first VLAN tag. When the second VLAN tag matches the first VLAN tag, the method may include dropping the ingress frame. The method may still further include counting down a second first aging time after snooping the egress frame. After the second aging time has elapsed, the method may include deleting the first VLAN tag.

Additional disclosed aspects for Ethernet loopback detection include a network element including a processor and non-transitory computer readable memory media accessible to the processor, as well as a network system including the network element.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective element. Thus, for example, device "72-1" refers to an instance of a device class, which may be referred to collectively as devices "72" and any one of which may be referred to generically as device "72".

Figure 1:
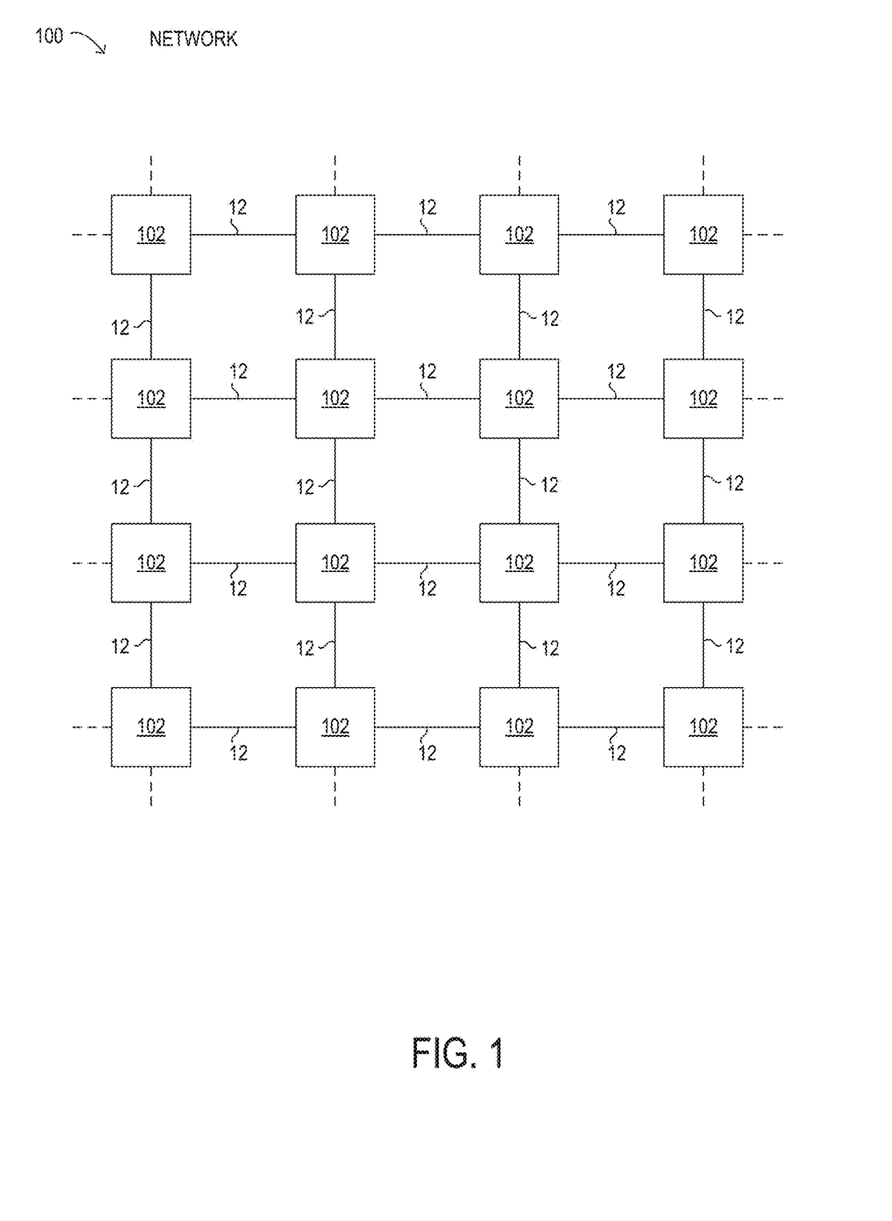
FIG. 1 is a block diagram of selected elements of an embodiment of a network according to the present disclosure.

Turning now to the drawings, FIG. 1 is a block diagram showing selected elements of an embodiment of network 100. In certain embodiments, network 100 may be an Ethernet network. Network 100 may include one or more transmission media 12 operable to transport one or more signals communicated by components of network 100. The components of network 100, coupled together by transmission media 12, may include a plurality of network elements 102. In the illustrated network 100, each network element 102 is coupled to four other nodes. However, any suitable configuration of any suitable number of network elements 102 may create network 100. Although network 100 is shown as a mesh network, network 100 may also be configured as a ring network, a point-to-point network, or any other suitable network or combination of networks. Network 100 may be used in a short-haul metropolitan network, a long-haul inter-city network, or any other suitable network or combination of networks.

Each transmission medium 12 may include any system, device, or apparatus configured to communicatively couple network elements 102 to each other and communicate information between corresponding network elements 102. For example, a transmission medium 12 may include an optical fiber, an Ethernet cable, a T1 cable, a WiFi signal, a Bluetooth signal, or other suitable medium.

Network 100 may communicate information or "traffic" over transmission media 12. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may be transmitted deterministically (also referred to as 'real-time') and/or stochastically. Traffic may be communicated via any suitable communications protocol, including, without limitation, the Open Systems Interconnection (OSI) standard and the Internet Protocol (IP). Additionally, the traffic communicated via network 100 may be structured in any appropriate manner including, but not limited to, being structured in frames, packets, or an unstructured bit stream.

Each network element 102 in network 100 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 3.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

In operation of network 100, certain network elements 102 may represent interfaces between a service provider network and a customer network, which is referred to as a user network interface (UNI). A network element that is an edge device at the UNI on the service provider network side is referred to as a UNI-N device. A network element (or other device) that is an edge device at the UNI on the customer network side is referred to as a UNI-C device. In certain embodiments, the UNI-C device is a network interface device (NID). Thus, at the UNI, the UNI-N edge device may forward traffic to the NID (or other UNI-C device, such as customer premises equipment) intended for the customer network, while the NID (or other UNI-C device) may forward traffic intended for the service provider network to the UNI-N edge device. The forwarding of traffic may be based on media access controller (MAC) addresses assigned to individual network ports. When virtual port addressing is used, such as with the non-bridging point-to-point implementation of connection-oriented Ethernet (COE), forwarding may be accomplished using virtual local area network (VLAN) tags in the Ethernet frames, which may not rely upon MAC addresses.

However, at the UNI-C side of the UNI, loopbacks of Ethernet connections may occur. The loopbacks may be physical loopbacks, where an incoming network connection is physically connected to an outgoing network port at the UNI-C. The loopbacks may be logical loopbacks, where a UNI-C device is engaged in improper forwarding behavior that sends traffic back out to the UNI-N edge device from somewhere within the UNI-C. Regardless of the origin and intent of the loopback, such loopback connections are undesirable for an operator of the service provider network, because the loopback generally results in unwanted traffic at the service provider network. For example, when the loopback traffic was originally part of a multicast, an exponential increase in the amount of undesired or wasted traffic may result at the service provider network.

Various measures to handle such loopbacks problems may be impractical to implement. For example, injection of test frames to detect the loopback may violate service-level agreements (SLA) for the customer network, which may specify that the customer network shall not receive any service provider traffic. Some nodes in the service provider network may not be L2 bridge learning nodes that can detect MAC address locations and associated network topologies. Even L2 bridge learning nodes may cause degraded performance and undesirable delays when faced with loopback traffic, because of the excessive numbers of MAC relearning events that result due to improper MAC addresses in the destination and source fields of looped-back Ethernet frames. Measures based on MAC addresses may not be usable in networks implemented with certain COE architectures.

As will be described in further detail, network elements 102 that are UNI-N edge devices at a UNI may implement the methods described herein for Ethernet loopback detection and service traffic blocking. The UNI-N edge device may select an egress frame intended for the UNI-C and may snoop the egress frame. A first MAC address in a source field of the egress frame may be recorded by the UNI-N edge device. Then, ingress framed received from the UNI-C may be monitored for a second MAC address in their source fields. When the second MAC address matches the first MAC address, the UNI-N edge device may ascertain that an improper loopback of network traffic is occurring at the UNI-C and may drop the ingress frame accordingly. In certain embodiments, the procedure for loopback detection may check for both MAC addresses and VLAN tags that are improperly returned to the service provider network. Thus when both a MAC address and a VLAN tag in a source field of the ingress frame matches with the MAC address and the VLAN tag from an egress frame, the loopback may be identified and the ingress frame may be dropped.

Figure 2:
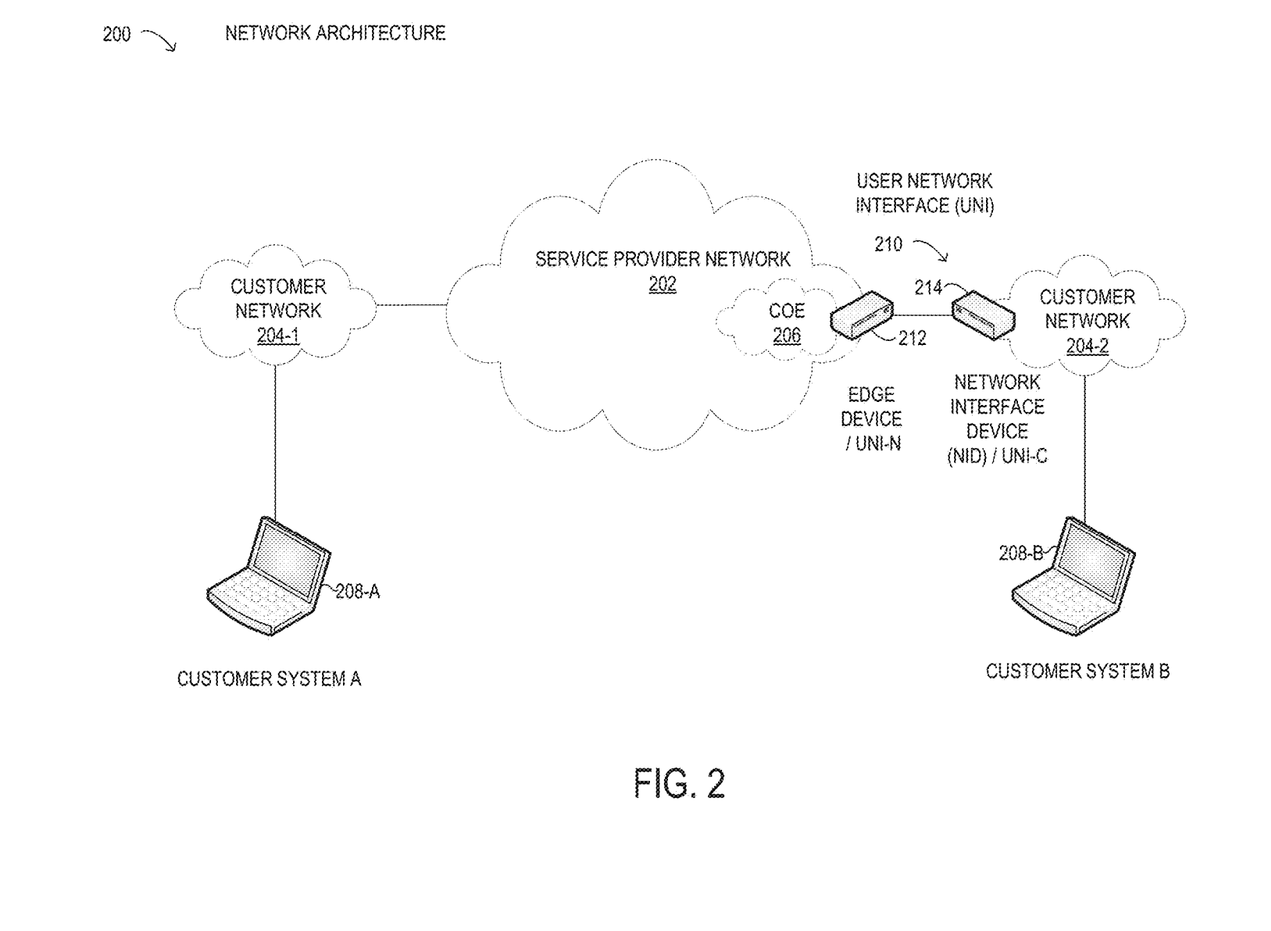
FIG. 2 is a block diagram of selected elements of an embodiment of a network architecture according to the present disclosure.

Referring now to FIG. 2, a block diagram of selected elements of an embodiment of exemplary network architecture 200 is illustrated. In particular embodiments, at least a portion of network architecture 200 may represent an implementation of network 100 described above with respect to FIG. 1. In exemplary network architecture 200, additional details and topologies for customer network 204 and service provider network 202 are presented.

In FIG. 2, customer network 204 is shown as two distinct sub-networks, namely customer network 204-1 and customer network 204-2. Customer system A 208-A is a computer system operated by the customer at customer network 204-1, while customer system B 208-B is a computer system operated by the customer at customer network 204-2. Because customer network 204-1 and 204-2 may be at different locations, the customer may engage the network services of the service provider, in the form of service provider network 202, to bridge customer networks 204-1 and 204-2. Thus, service provider network 202 may provide forwarding of network traffic between customer networks 204-1 and 204-2. Furthermore, service provider network 202 may establish a connection oriented Ethernet (COE) 206 implementation that enables customer network 204 to appear as a local area network (LAN) to the customer.

Specifically, in network architecture 200, user network interface (UNI) 210 is an interface between service provider network 202 and customer network 204-2. Thus, the side of UNI 210 towards service provider network 202 is referred to as UNI-N, while the side of UNI 210 towards customer network 204-2 is referred to as UNI-C. At UNI-N, edge device 212 may represent a network element implementing bridging functionality that is directly linked at UNI 210 to UNI-C. As shown, network interface device (NID) 214 represents a UNI-C edge device. However, in various embodiments, NID 214 may be omitted and another customer premises device may serve as the UNI-C edge device in place of NID 214, as described herein. As noted previously, at certain times, a loopback may occur at UNI-C. The loopback may be prior to NID 214, at NID 214, immediately after NID 214, or somewhere interior at customer network 204-2. The loopback may be intentional or may be inadvertent. The loopback may be a physical loopback or a logical loopback. The loopback may be without malicious intent or may be with malicious intent. The customer may be aware of the loopback or may not be aware of the loopback. In any case, the loopback causes network traffic intended for customer network 204-2 to be sent back to edge device 212, which is undesirable.

Accordingly, edge device 212 at UNI-N may snoop an egress frame sent to NID 214. The egress frame may be selected at random. The snooping may occur at certain intervals. Upon snooping the egress frame, edge device 212 may store a first MAC address from a first source field of the egress frame. For example, edge device 212 may store the first MAC address in a memory. The first MAC address may be associated with an aging time that begins when the first MAC address is snooped or stored. Edge device 212 may start a timer when the aging time begins and when the timer elapses, the first MAC address may be deleted from the memory. In certain instances, a first VLAN tag from a second source field in the egress frame may also be recorded, in addition to the first MAC address. The same timer may be used for aging the first VLAN tag. In some embodiments, a second aging time and timer different from the aging time and timer used for the first MAC address, such that the first VLAN tag may be deleted independently (e.g., faster or slower) than the first MAC address is deleted. Then, edge device 212 may snoop another egress frame. In this manner, the methods described herein may be continuously repeated for up-to-date monitoring of Ethernet loopbacks.

After the egress frame has been snooped, edge device 212 may begin to monitor ingress frames received from NID 214. In certain embodiments, every single ingress frame received from NID 214 may be monitored. A second MAC address in the first source field of the ingress frame may be compared with the first MAC address. Alternatively, the second MAC address and a second VLAN tag in the second source field of the ingress frame may be compared with the first MAC address and the first VLAN tag. In this manner, the ingress frame may be analyzed to determine that the ingress frame has been looped back at UNI-C. When the second MAC address matches the first MAC address, it may be ascertained that the ingress frame has been looped back. Alternatively, when the second MAC address and the second VLAN tag matches the first MAC address and the first VLAN tag, it may be ascertained that the ingress frame has been looped back. When the ingress frame has been determined to be a loopback frame, edge device 212 may drop the ingress frame and may prevent further adverse consequences resulting from the loopback ingress frame to service provider network 202.

Figure 3:
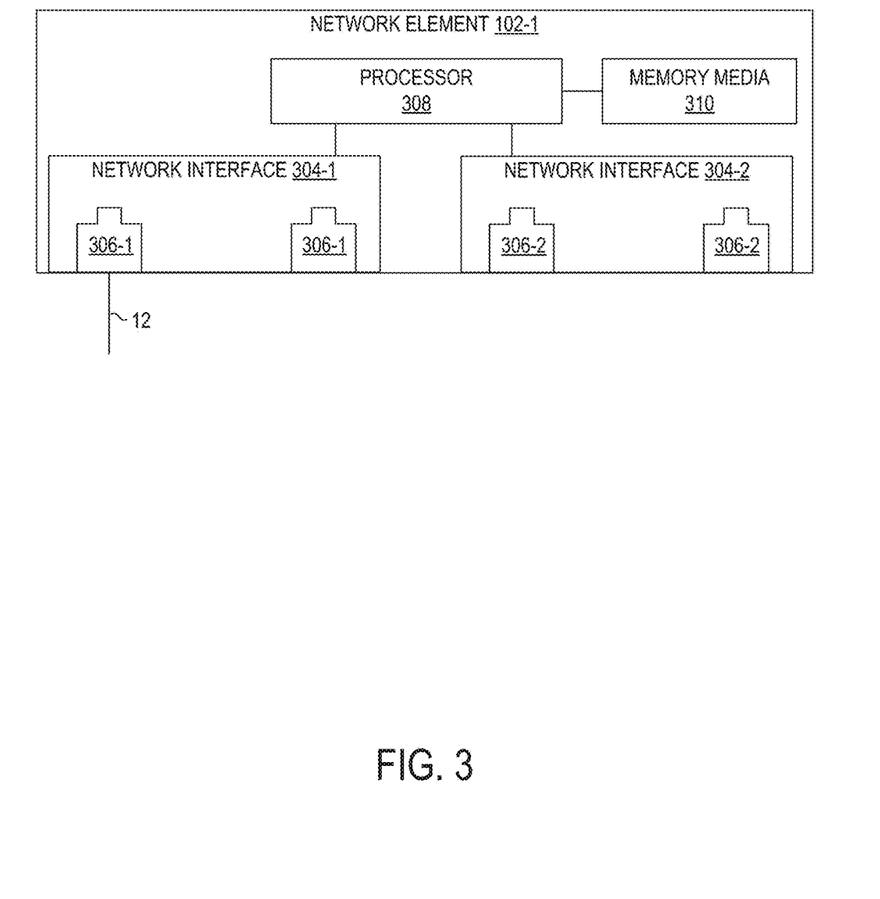
FIG. 3 is a block diagram of selected elements of an embodiment of a network element according to the present disclosure.

Referring now to FIG. 3, a block diagram of selected elements of an embodiment of exemplary Ethernet network element 102-1 is illustrated. As discussed above with respect to FIG. 1, each network element 102 may be coupled to one or more other network elements 102 via one or more transmission media 12. Each network element 102 may generally be configured to receive data from and/or transmit data to one or more other network elements 102. Network element 102-1, as shown, includes processor 308 and memory media 310, along with network interface 304-1 having ports 306-1 and network interface 304-2 having ports 306-2. In particular embodiments, network element 102-1 is a UNI-N edge device at a UNI between a service provider network and a customer network, such as UNI-N edge device 212 (see FIG. 2).

As depicted in FIG. 3, each network element 102 may include processor 308 and memory media 310 that may store instructions executable by processor 308. As shown, memory media 310 may represent volatile, non-volatile, fixed, and/or removable media, and may be implemented using magnetic and/or semiconductor memory. Memory media 310 is capable of storing instructions (i.e., code executable by processor 308) and/or data. Memory media 210 and/or at least a portion of contents of memory media 310 may be implemented as an article of manufacture comprising non-transitory computer readable memory media storing processor-executable instructions. Memory media 310 may store instructions including an operating system (OS), which may be any of a variety of operating systems, such as a UNIX variant, LINUX, a Microsoft Windows® operating system, or a different operating system. It is noted that network interface 304 may also include a processor and memory media (not shown) in certain embodiments. A processor and memory included with network element 102, such as processor 308 and memory media 310 or another processor and memory media, may implement Ethernet loopback detection and service traffic blocking, as described herein. For example, memory media 310 may store instructions to implement method 400 (see FIG. 4) at network element 102. Network element 102 may implement forwarding functionality and may be implemented using various means, such as, but not limited to, at least one microprocessor and/or at least one field-programmable gate array (FPGA) and/or a system on chip (SoC). The use of an FPGA for at least certain portions of the forwarding functionality may be particularly advantageous due to the deterministic parallelism between input/output (I/O) nodes that an FPGA can deliver. It is noted that an SoC used for the forwarding functionality may include a combination of at least one microprocessor, such as processor 308, and at least one FPGA.

In FIG. 3, network elements 102 are shown including at least one network interface 304, which provides a plurality of ports 306 that receive a corresponding transmission media 12 (see also FIG. 1). Ports 306 and transmission media 12 may represent galvanic and/or optical network connections. Each network interface 304 may include any suitable system, apparatus, or device configured to serve as an interface between a network element 102 and transmission medium 12. Each network interface 304 may enable its associated network element 102 to communicate with other network elements 102 using any of a variety of transmission protocols and/or standards. Network interface 304 and its various components may be implemented using hardware, software, or any combination thereof. In certain embodiments, network interfaces 304 may include a network interface card (not shown in FIG. 3). In various embodiments, network interfaces 304 may include a line card (not shown in FIG. 3). Each port 306 may include a system, device or apparatus configured to serve as a physical interface between corresponding transmission medium 12 and network interface 304. In some embodiments, port 306 may comprise an Ethernet port. Although in FIG. 3 network interfaces 304 are shown with 2 instances of ports 306 for descriptive clarity, in different embodiments, network interfaces 304 may be equipped with different numbers of ports 306 (e.g., 4, 6, 8, 16 ports, etc.). In various embodiments, network element 102 may be configured to receive data and route such data to a particular network interface 304 and/or port 306 based on analyzing the contents of the data and/or based on a characteristic of a signal carrying the data (e.g., a wavelength and/or modulation of the signal). In certain embodiments, network element 102 may include a switching element (not shown) that may include a switch fabric (SWF).

Figure 4:
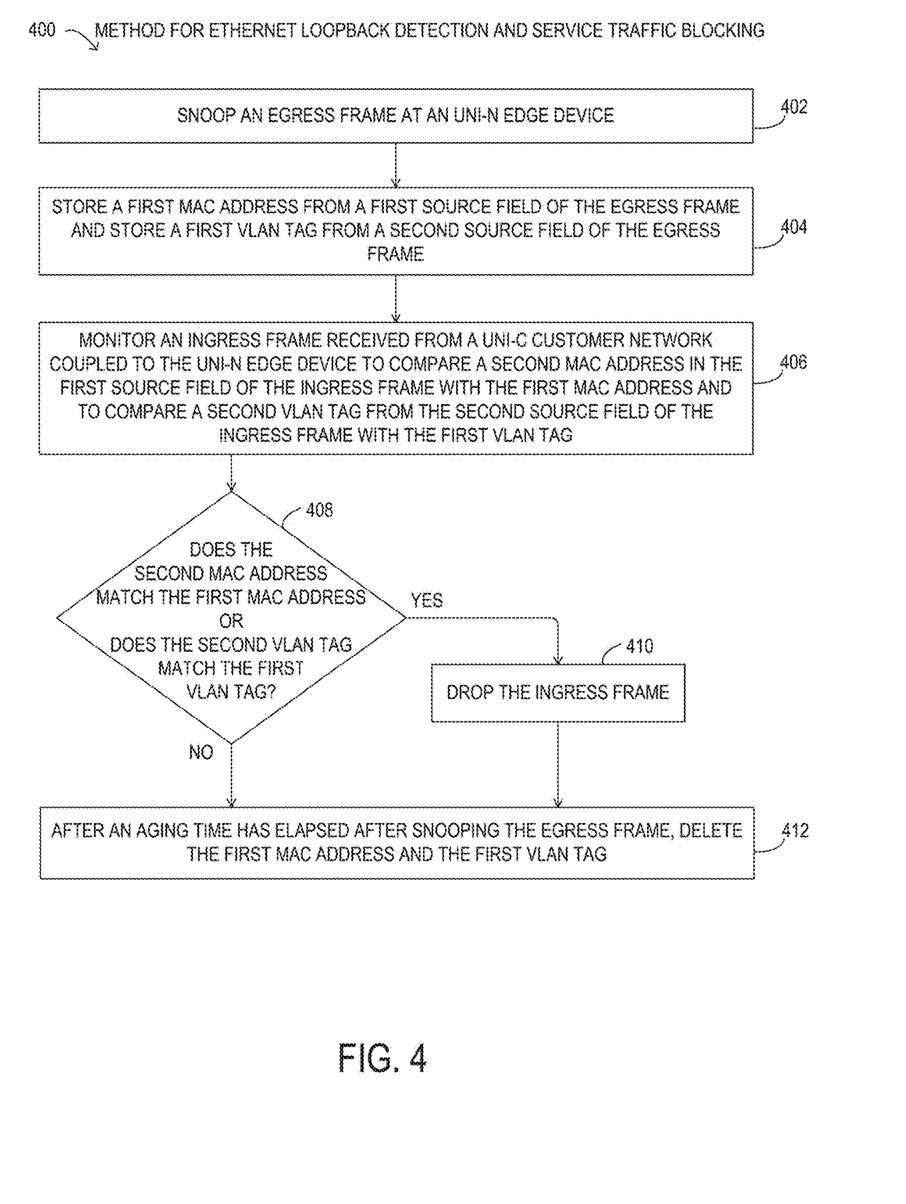
FIG. 4 is a flow chart of selected elements of an embodiment of a method for Ethernet loopback detection according to the present disclosure.

Turning now to FIG. 4, a block diagram of selected elements of an embodiment of method 400 for Ethernet loopback detection and service traffic blocking is shown in flow chart format. Method 400 may be implemented by network element 102, and in particular, by edge device 212 at UNI-N. It is noted that certain operations depicted in method 400 may be rearranged or omitted, as desired.

Method 400 may begin by snooping (operation 402) an egress frame at an UNI-N edge device. A first MAC address from a first source field of the egress frame may be stored (operation 404) and a first VLAN tag address from a second source field of the egress frame may be stored (operation 404). In certain embodiments, storing of the VLAN tag may be omitted from operation 404. An ingress frame received from a UNI-C customer network may be monitored (operation 406) to compare a second MAC address in the first source field of the ingress frame with the first MAC address and to compare a second VLAN tag from the second source field of the ingress frame with the first VLAN tag. In some embodiments, the ingress frame may be received from a UNI-C NID, when present. When the VLAN tag is not stored in operation 404, comparing the VLAN tags in operation 406 may be omitted. Then, a determination is made whether the second MAC address matches (operation 408) the first MAC address or the second VLAN tag matches (operation 408) the first VLAN tag. In different embodiments, operation 408 may include determining a match only for the first and second MAC addresses, determining a match only for the first and second VLAN tags, or determining matches for both the first and second MAC addresses and the first and second VLAN tags. When the result of operation 408 is NO, the ingress frame may be dropped (operation 410). When the result of operation 408 is NO or after operation 410, after an aging time has elapsed after snooping the egress frame, the first MAC address and the first VLAN tag may be deleted (operation 412). Instead of after snooping the egress frame, operation 412 may be performed after storing the egress frame. As noted previously, in some embodiments, a first and second aging time and a first and second timer are independently used, respectively, for the first MAC address and the first VLAN tag in operation 412.

A disclosed method and system for Ethernet loopback detection snoops an egress frame at a UNI-N edge device and records at least one source field of the egress frame, such as a MAC address or a VLAN tag. Ingress frames at the UNI-N edge device are monitored for having the same value in the source field as the egress frame. When an ingress frame has the same source field value as the egress frame, the ingress frame is identified as a loopback frame and is dropped at the UNI-N edge device.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for Ethernet loopback detection, the method comprising:
    snooping an egress frame at a network element, wherein the network element is an edge device of a user network interface in a service provider network, the network element coupled to a customer network at the user network interface;
    storing a first media access controller (MAC) address from a first source field of the egress frame;
    monitoring an ingress frame received from the customer network, wherein a second MAC address in the first source field of the ingress frame is compared with the first MAC address in the first source field of the egress frame; and
    when the second MAC address matches the first MAC address, dropping the ingress frame.

2. The method of claim 1, further comprising:
    counting down a first aging time after snooping the egress frame; and
    after the first aging time has elapsed, deleting the first MAC address.

3. The method of claim 1, wherein the first egress frame is chosen at random.

4. The method of claim 1, wherein the monitoring the ingress frame is performed for each ingress frame received from the customer network.

5. The method of claim 1, wherein the service provider network implements a connection oriented Ethernet serving the customer network.

6. The method of claim 5, further comprising:
    storing a first virtual local area network (VLAN) tag from a second source field of the egress frame;
    wherein monitoring the ingress frame received from the customer network includes comparing a second VLAN tag in the second source field of the ingress frame with the first VLAN tag; and
    when the second VLAN tag matches the first VLAN tag, dropping the ingress frame.

7. The method of claim 6, further comprising:
    counting down a second first aging time after snooping the egress frame; and
    after the second aging time has elapsed, deleting the first VLAN tag.

8. A network element for Ethernet loopback detection, the network element comprising:
    a processor;
    non-transitory computer readable memory media accessible to the processor, wherein the network element is an edge device of a user network interface in a service provider network, the network element coupled to a customer network at the user network interface, and
    wherein the memory media store processor-executable instructions, the instructions, when executed by the processor, cause the processor to:
        snoop an egress frame intended for the customer network;
        store a first media access controller (MAC) address from a first source field of the egress frame;
        monitor an ingress frame received from the customer network, wherein a second MAC address in the first source field of the ingress frame is compared with the first MAC address in the first source field of the egress frame; and when the second MAC address matches the first MAC address, drop the ingress frame.

9. The network element of claim 8, further comprising instructions executable to:

countdown a first aging time after storing the egress frame; and after the first aging time has elapsed, delete the first MAC address.

10. The network element of claim 8, wherein the instructions to snoop the egress frame include instructions to:

select the first egress frame at random.

11. The network element of claim 8, wherein the instructions to monitor the ingress frame are performed for each ingress frame received from the customer network.

12. The network element of claim 8, wherein the service provider network implements a connection oriented Ethernet serving the customer network.

13. The network element of claim 12, further comprising instructions executable to:

store a first virtual local area network (VLAN) tag from a second source field of the egress frame;

wherein the instructions to monitor the ingress frame received from the customer network include instructions to compare a second VLAN tag in the second source field of the ingress frame with the first VLAN tag; and when the second VLAN tag matches the first VLAN tag, drop the ingress frame.

14. The network element of claim 13, further comprising instructions executable to:

countdown a second aging time after storing the egress frame; and after the second aging time has elapsed, delete the first VLAN tag.

* * * * *